(12) United States Patent
Wickstrom

(10) Patent No.: US 9,992,925 B2
(45) Date of Patent: Jun. 12, 2018

(54) PAIRED ROW FURROW OPENER

(71) Applicant: Victor A. Wickstrom, Dunmore (CA)

(72) Inventor: Victor A. Wickstrom, Dunmore (CA)

( * ) Notice: Subject to any disclaimer, the term of this patent is extended or adjusted under 35 U.S.C. 154(b) by 0 days. days.

(21) Appl. No.: 15/690,676

(22) Filed: Aug. 30, 2017

(65) Prior Publication Data
US 2018/0035601 A1 Feb. 8, 2018

Related U.S. Application Data

(62) Division of application No. 15/227,522, filed on Aug. 3, 2016, now Pat. No. 9,750,175.

(51) Int. Cl.
*A01C 5/06* (2006.01)

(52) U.S. Cl.
CPC ..................... *A01C 5/062* (2013.01)

(58) Field of Classification Search
CPC .............. A01C 5/062; A01C 5/06; A01C 7/06
USPC ........................ 111/111, 122–124, 152, 153
See application file for complete search history.

(56) References Cited

U.S. PATENT DOCUMENTS

| | | | |
|---|---|---|---|
| 6,182,587 B1 * | 2/2001 | Lempriere | A01O 5/062 111/124 |
| 6,332,412 B1 * | 12/2001 | Swab | A01B 35/26 111/152 |
| 6,405,665 B1 * | 6/2002 | Henry | A01O 5/062 111/124 |
| 6,457,426 B1 * | 10/2002 | Cruson | A01B 15/025 111/154 |
| 6,640,731 B1 * | 11/2003 | Rowlett | A01B 15/025 111/152 |
| 7,156,028 B2 * | 1/2007 | Summach | A01B 15/02 111/118 |
| 7,506,594 B2 * | 3/2009 | Bergen | A01O 5/062 111/124 |
| 7,617,782 B2 * | 11/2009 | Sheppard | A01O 5/062 111/135 |
| 7,617,783 B1 * | 11/2009 | Cruson | A01O 5/062 111/150 |
| 8,869,717 B2 * | 10/2014 | Memory | A01O 5/062 111/152 |
| 2002/0069801 A1 * | 6/2002 | Cruson | A01B 15/025 111/186 |
| 2009/0090524 A1 * | 4/2009 | Carson, Jr. | A01B 15/025 172/772 |

(Continued)

FOREIGN PATENT DOCUMENTS

WO  WO-2013033784 A1 *  3/2013  ............. A01C 5/062
WO  WO-2013177662 A1 * 12/2013  ............. A01C 5/062

*Primary Examiner* — John Weiss

(57) ABSTRACT

A paired row furrow opener can include a seed boot body, a fertilizer passageway, a seed passageway, at least one soil deflecting edge, and at least one row soil deflecting surface. The seed boot body can extend along a longitudinal axis between a forward end and a rearward end. The fertilizer passageway can extend through the seed boot body between an outlet and an inlet elevated from the outlet. The seed passageway can extend through the seed boot body between an outlet and an inlet. The at least one soil deflecting edge can be integral with the seed boot body. The at least one row soil deflecting surface can extend aft from the at least one soil deflecting edge along the longitudinal axis and can face upward.

19 Claims, 10 Drawing Sheets

(56) References Cited

U.S. PATENT DOCUMENTS

| | | | |
|---|---|---|---|
| 2013/0233215 A1* | 9/2013 | Cruson | A01O 5/062 111/119 |
| 2015/0319915 A1* | 11/2015 | Pfitzner | A01C 7/06 111/163 |

* cited by examiner

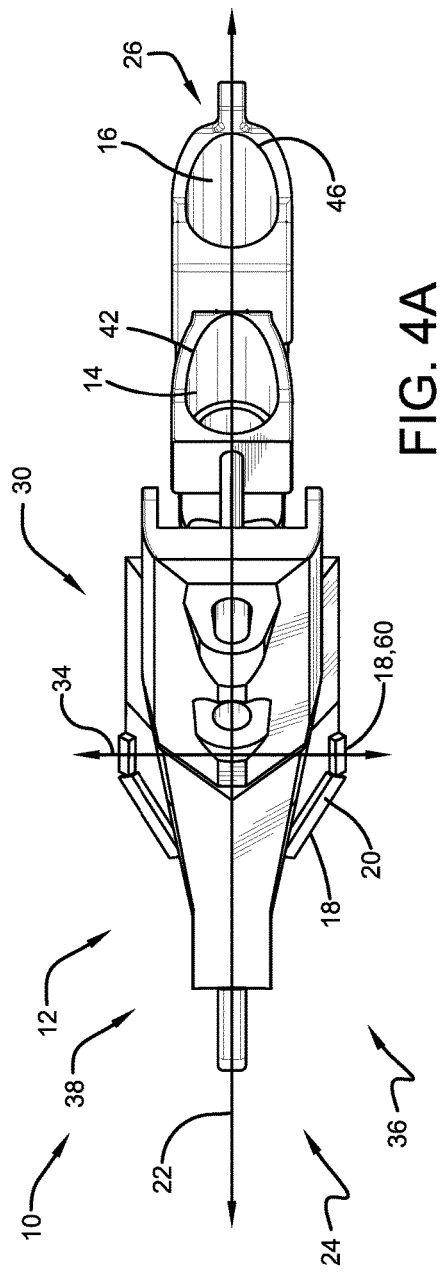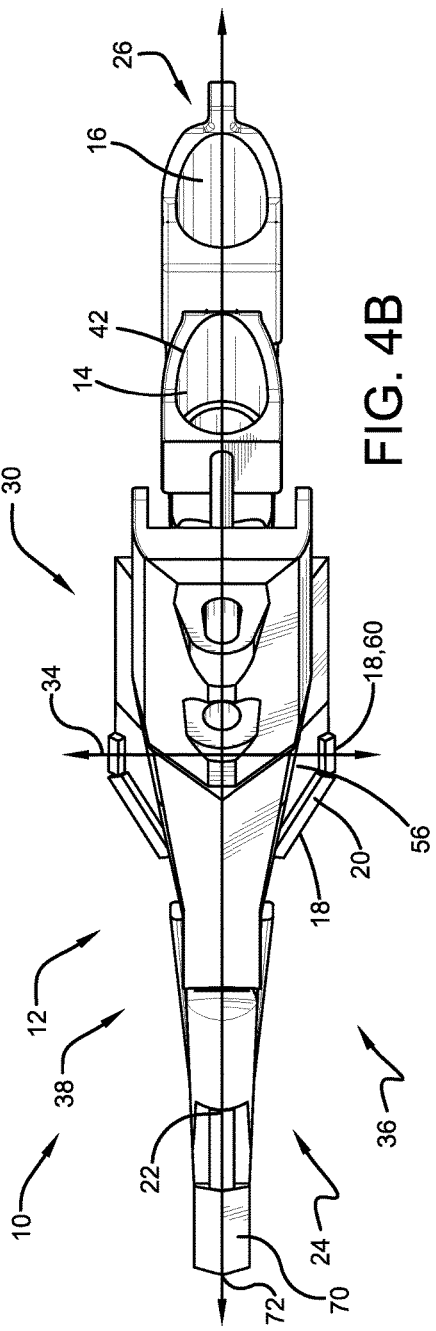
FIG. 4A
FIG. 4B

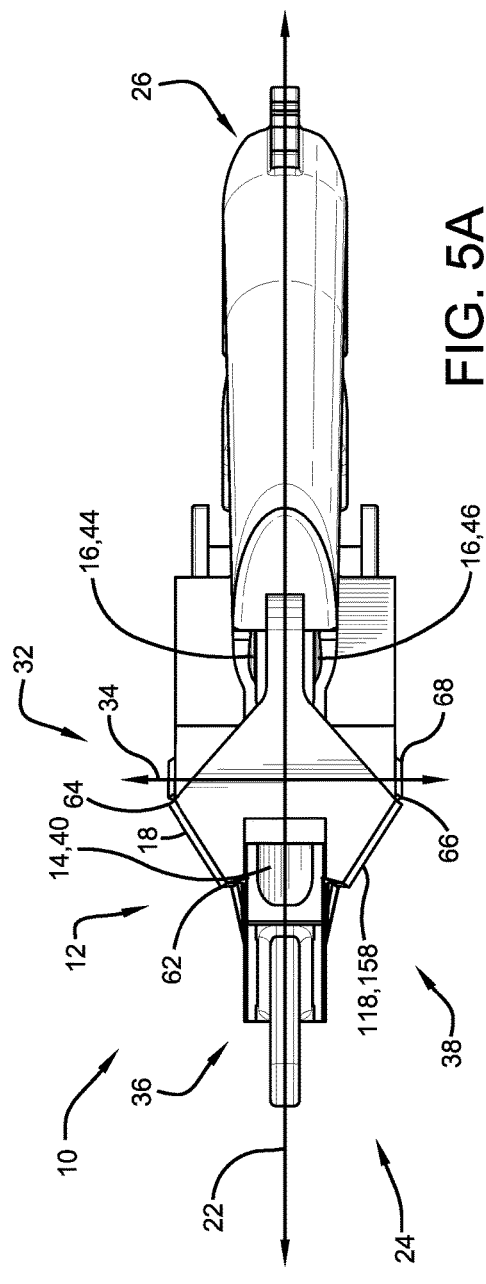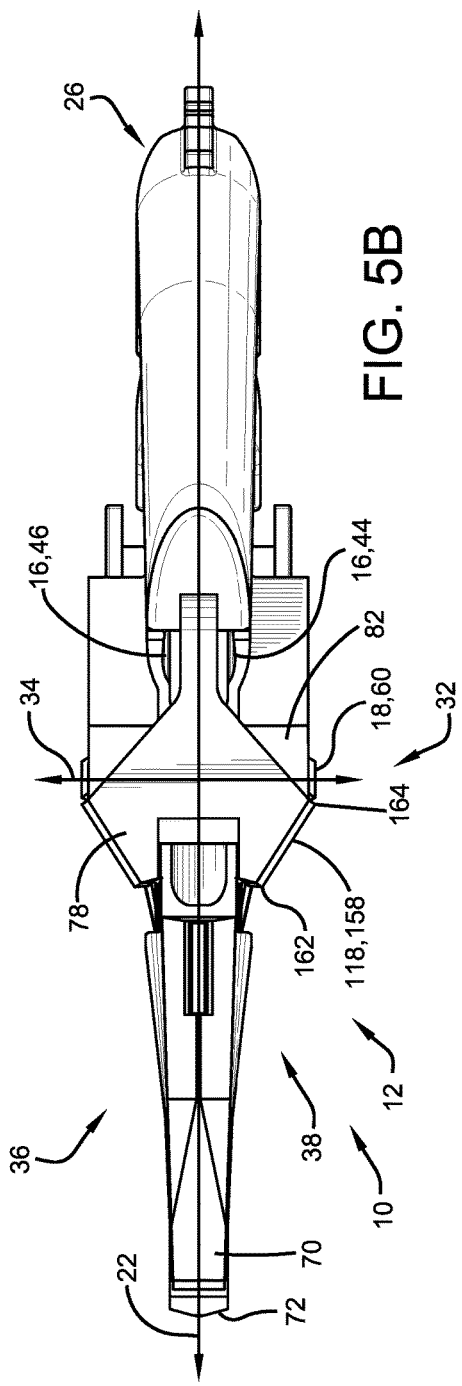

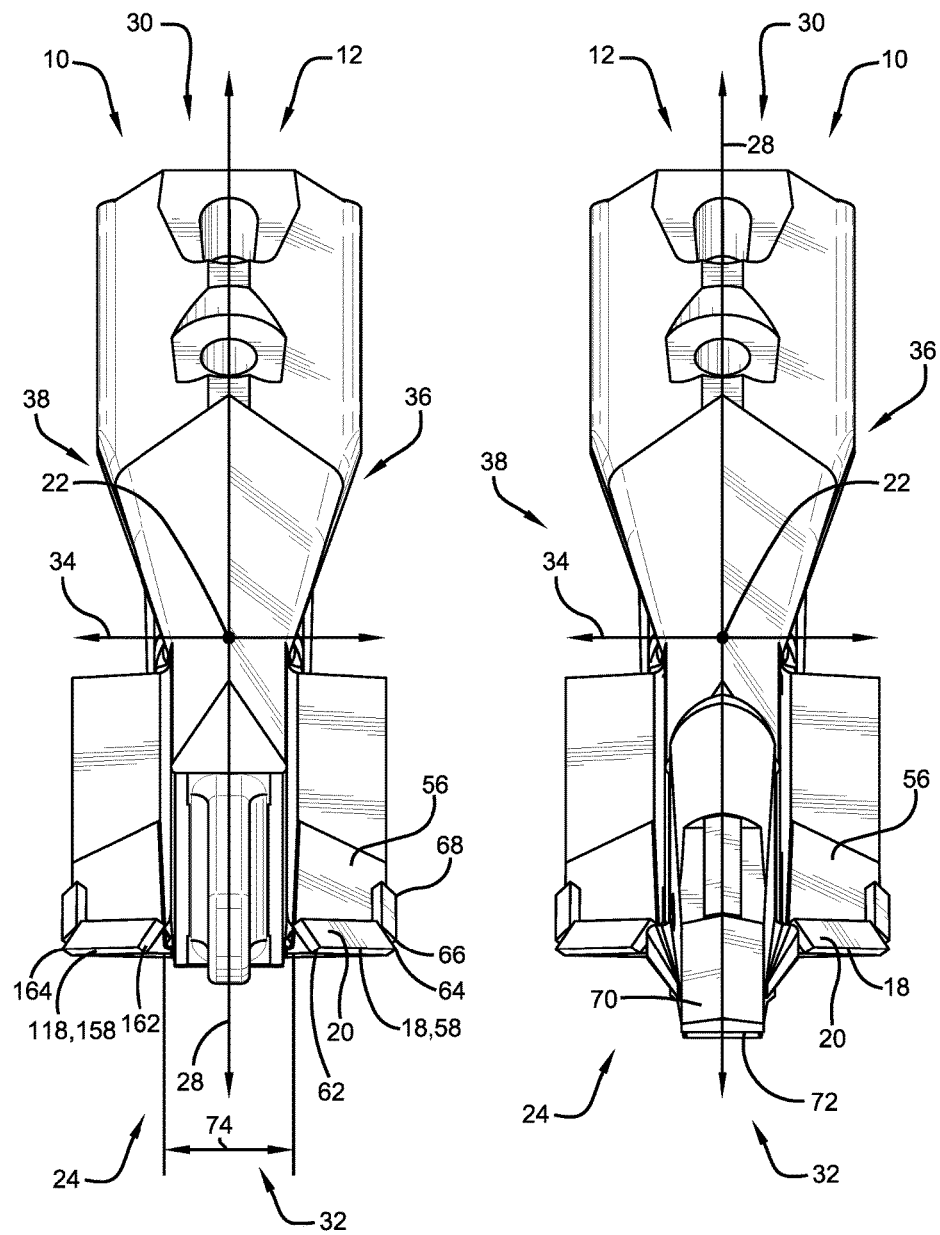

PAIRED ROW FURROW OPENER

CROSS-REFERENCE TO RELATED APPLICATIONS

This application is a divisional application of application Ser. No. 15/227,522 for a PAIRED ROW FURROW OPENER, filed on Aug. 3, 2016, which is hereby incorporated by reference in its entirety.

BACKGROUND

1. Field

The present disclosure relates to processes and instruments for inserting seed and fertilizer in the ground, accompanied by the forming of a furrow to receive the material, and more particularly to devices adapted to be drawn through the soil to open a long, shallow, narrow trench therein and wherein the opening element has an earth-breaking portion, one or more wing portions extending laterally beyond the sides thereof which form at least a partial V-shape when viewed elevation.

2. Description of Related Prior Art

WO2013/177662 discloses a FURROWING TIP AND SOIL OPENER. Aspects of that invention provide furrowing tip bodies and soil openers that include the furrowing tip bodies. One furrowing tip body has a knife portion; a wing portion extending rearwardly and laterally outwardly from at least one side of the knife portion; and a ridge member extending below a bottom wall of the tip body and rearwardly from the forward end of the tip body rearward of the knife portion to a primary outlet opening in the bottom wall of the tip body. Another furrowing tip body provided therein has a knife portion; a wing portion extending rearwardly and laterally outwardly from at least one side of the knife portion; at least one outlet opening in a rear face of the tip body; and at least one soil deflecting element projecting downward from a bottom wall of the tip body.

U.S. Pat. No. 6,332,412 discloses a PAIRED ROW FURROW OPENER. The ground-engaging paired row furrow forming tool includes a tool body having fore and aft ends with an outer edge defined on each of two opposing sides of the tool body. A furrowing wing is located adjacent each of the opposing sides and protrudes from bottom portions of the tool body. The tool body has lower surfaces including a central front surface portion which is angled upwards towards the fore end and a center passage is defined between the furrowing wings. This passageway is in part defined by a central rear surface portion which is adapted to be substantially aligned fore to aft in a direction of travel T during operation of the ground engaging tool. This paired row opener works well without compromise in a broad range of soil conditions without fouling and enables planting of seed rows spaced widely apart while minimizing soil surface disturbance.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A paired row furrow opener can include a seed boot body, a fertilizer passageway, a seed passageway, at least one soil deflecting edge, and at least one row soil deflecting surface. The seed boot body can extend along a longitudinal axis between a forward end and a rearward end aft of the forward end along the longitudinal axis. The seed boot body can also extend along a vertical axis between a bottom side and a top side elevated from the bottom side along the vertical axis. The seed boot body can also extend along a transverse axis between a right side and a left side spaced from one another along the transverse axis. The longitudinal axis can be perpendicular to the vertical axis and to the transverse axis. The vertical axis and the transverse axis can be perpendicular to one another. The longitudinal axis and the vertical axis can intersect and can be coplanar in a first plane centered with respect to the seed boot body. The fertilizer passageway can extend through the seed boot body between an outlet and an inlet elevated from the outlet along the vertical axis. The seed passageway can extend through the seed boot body between an outlet and an inlet elevated from the outlet of the seed passageway along the vertical axis. The at least one soil deflecting edge can be integral with the seed boot body. The at least one row soil deflecting surface can extend aft from the at least one soil deflecting edge along the longitudinal axis and can face upward with respect to the vertical axis.

BRIEF DESCRIPTION OF THE DRAWINGS

The detailed description set forth below references the following drawings:

FIG. 4A is a top view of the paired row furrow opener shown in FIG. 3;

FIG. 4B is a top view of the paired row furrow opener shown in FIG. 2;

FIG. 5A is a bottom view of the paired row furrow opener shown in FIG. 3;

FIG. 5B is a bottom view of the paired row furrow opener shown in FIG. 2;

FIG. 6A is a front view of the paired row furrow opener shown in FIG. 3;

FIG. 6B is a front view of the paired row furrow opener shown in FIG. 2;

DETAILED DESCRIPTION

Figure 1:
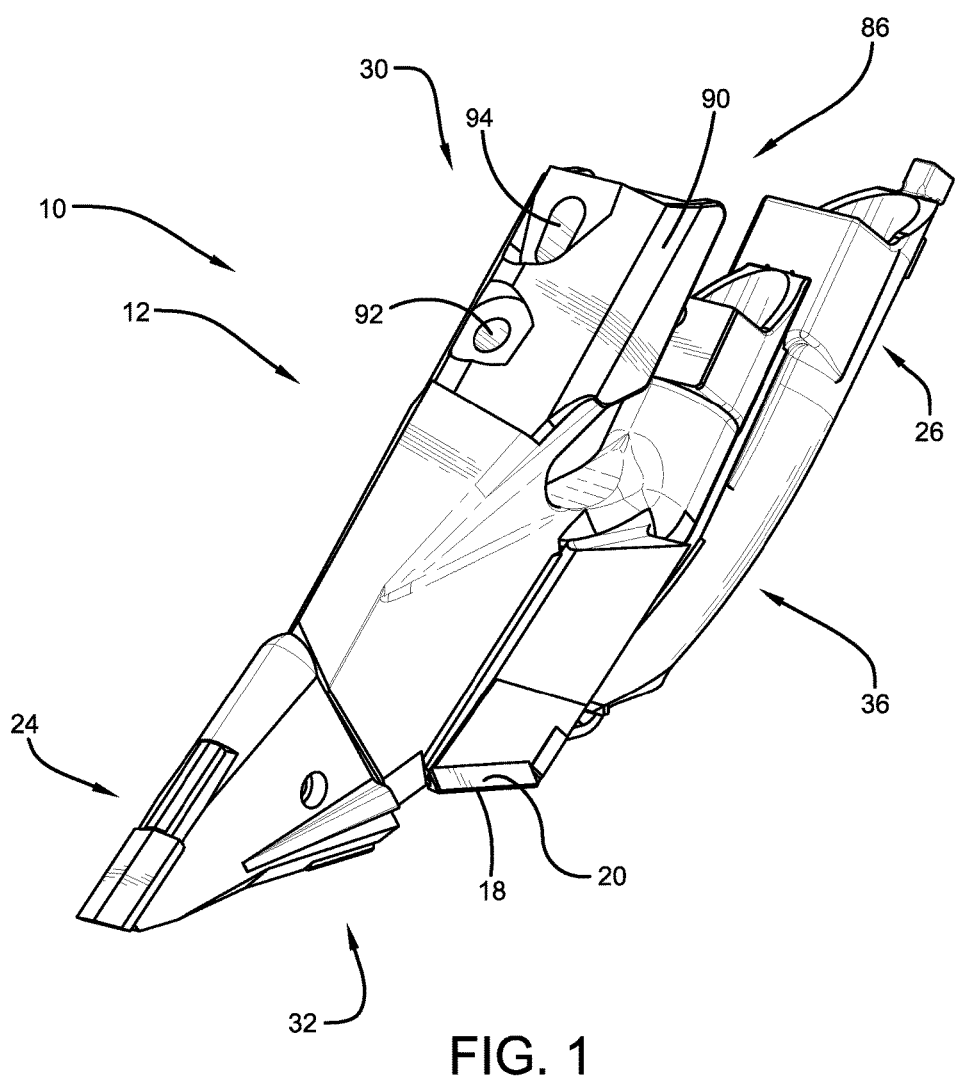
FIG. 1 is a perspective view of a paired row furrow opener according to an exemplary embodiment of the present disclosure.

The present disclosure, as demonstrated by the exemplary embodiment described below, can provide an enhanced paired row furrow opener. Referring now to the accompanying drawing figures, a paired row furrow opener 10 can include a seed boot body 12, a fertilizer passageway 14, a seed passageway 16, at least one soil deflecting edge 18, and at least one row soil deflecting surface 20. The seed boot body 12 can extend along a longitudinal axis 22 between a forward end 24 and a rearward end 26 aft of the forward end 24 along the longitudinal axis 22. The seed boot body 12 can also extend along a vertical axis 28 between a bottom side 32 and a top side 30 elevated from the bottom side 32 along the vertical axis 28. The seed boot body 12 can also extend along a transverse axis 34 between a right side 36 and a left side 38 spaced from one another along the transverse axis 34. The longitudinal axis 22 can be perpendicular to the vertical axis 28 and to the transverse axis 34. The vertical axis 28 and the transverse axis 34 can be perpendicular to one another. The longitudinal axis 22 and the vertical axis 28 can intersect and can be coplanar in a first plane centered with respect to the seed boot body 12. This plane is the plane of the cross-section shown in FIG. 8 and is substantially centered between the right side 36 and the left side 38 along the transverse axis 34.

In the remainder of this description, the structural features and attributes of the right side 36 are discussed in detail. It is noted that the exemplary paired row furrow opener 10 is symmetrical about the first plane. The structural features and attributes of the right side 36 are found also on the left side 38, but mirrored with respect to the right side 36. It is further noted that alternative embodiments of the present disclosure can be practiced in which the right side 36 and left side 38 are not mirrored with respect to one another.

Figure 8:
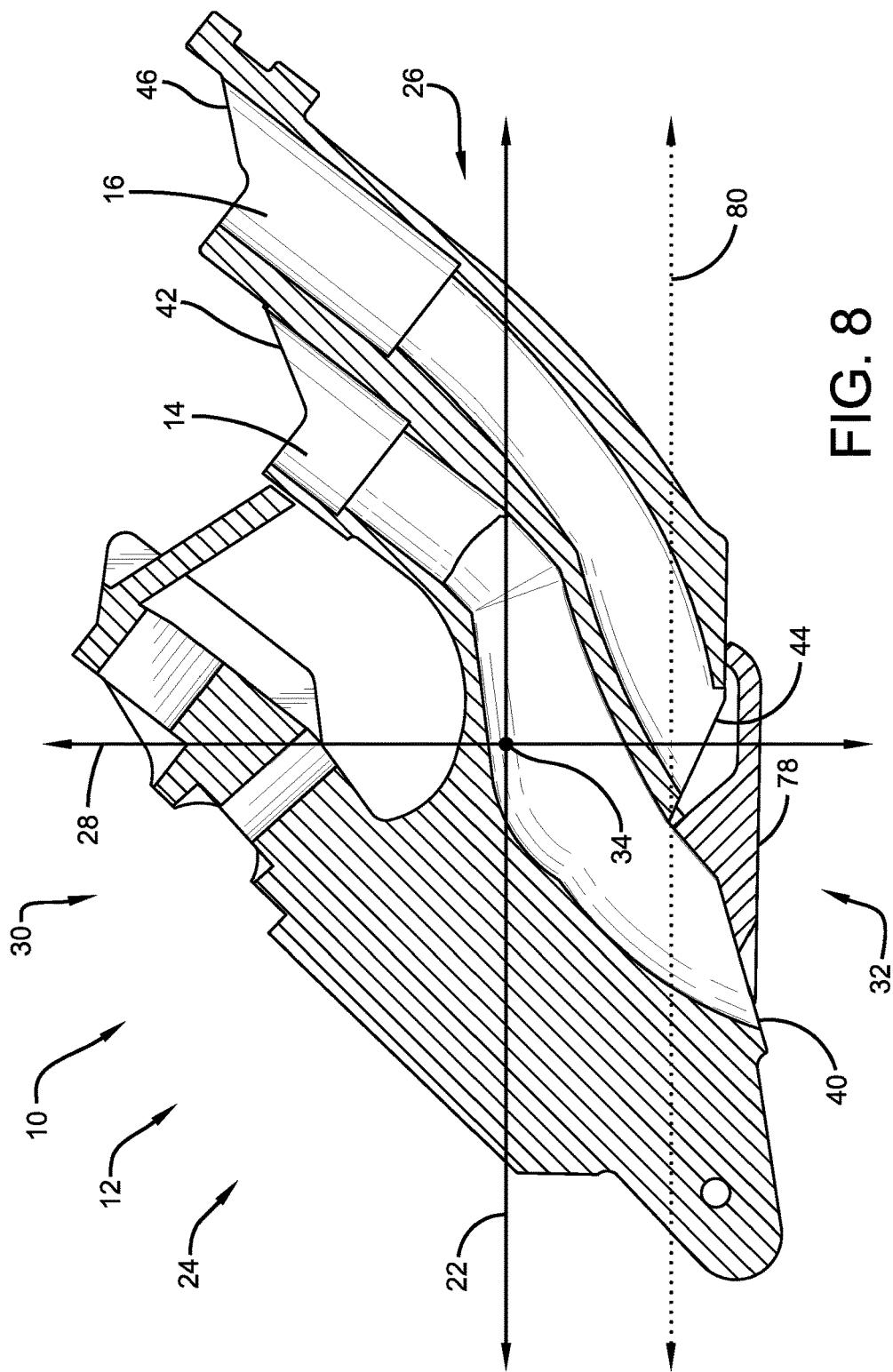
FIG. 8 is a cross-sectional view of the paired row furrow opener shown in FIG. 2 with the cross-section taken in a first plane.

The fertilizer passageway 14 can extend through the seed boot body 12 between an outlet 40 and an inlet 42 elevated from the outlet 40 along the vertical axis 28. This arrangement is best shown in FIG. 8. The seed passageway 16 can extend through the seed boot body 12 between an outlet 44 and an inlet 46 elevated from the outlet 44 of the seed passageway 16 along the vertical axis 28. The outlet 44 of the seed passageway 16 is forward of the inlet 46 of the seed passageway 16 along the longitudinal axis 22.

Figure 10:
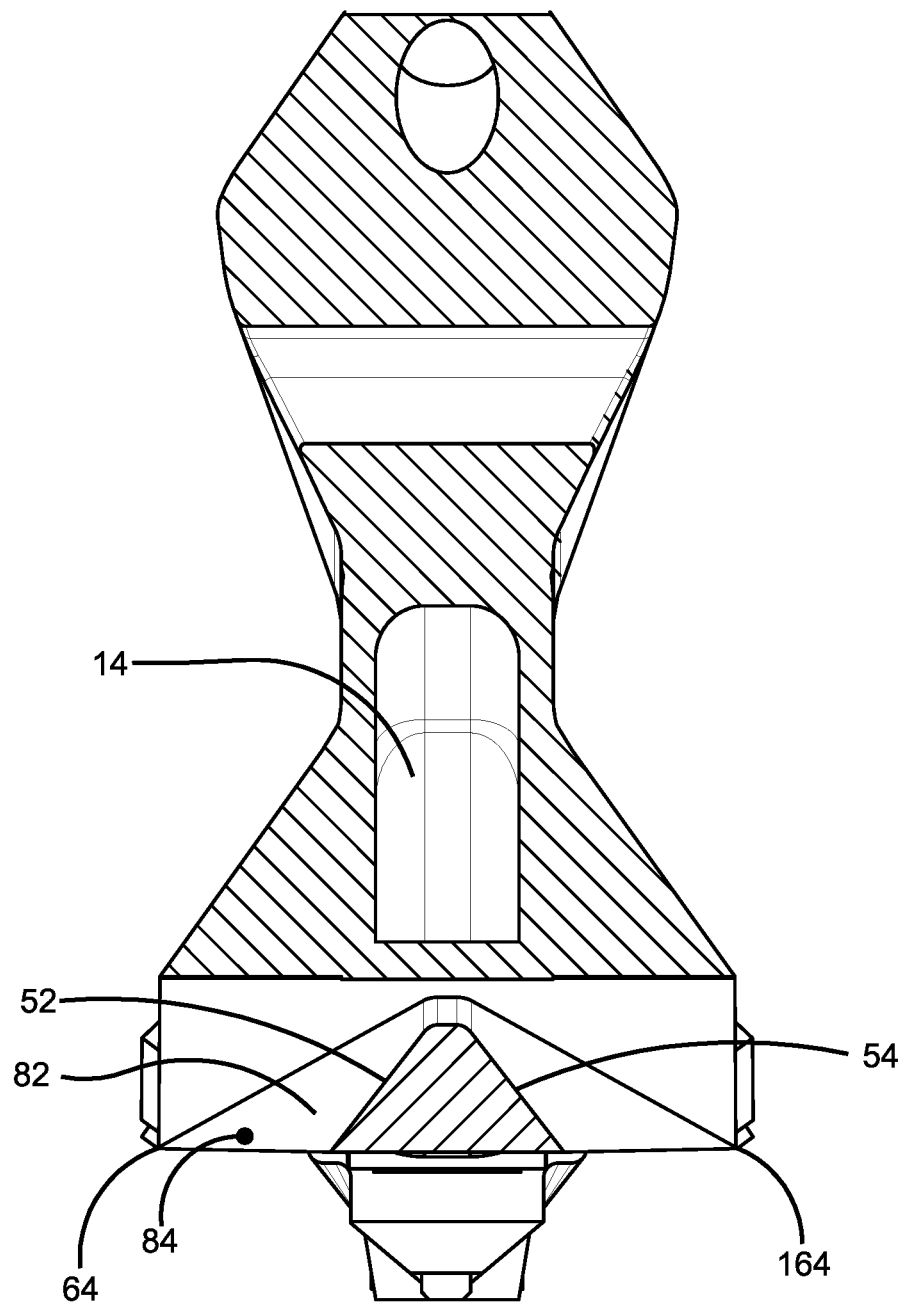
FIG. 10 is a cross-sectional view of the paired row furrow opener shown in FIG. 2 with the cross-section taken in a second plane that is perpendicular to the first plane.

The exemplary paired row furrow opener 10 also includes a bridge 48 and a seed deflector 50 positioned at the outlet 44. The bridge 48 can provide enhance the likelihood that seeds emerging from the outlet 44 reach the seed deflector 50. The seed deflector 48 can be substantially centered with respect to the outlet 44. The seed deflector 50 includes first and second seed deflecting surfaces 52, 54. As shown in FIG. 10, in cross-section in a plane perpendicular to the first plane, the first and second seed deflecting surfaces 52, 54 are sloped and can define sides of a triangle. The surfaces 52, 54 can increase in elevation relative to the vertical axis 28 with increasing distance from one of the right side 36 and the left side 38 in a direction toward the first plane along the transverse axis 34. The first and second seed deflecting surfaces 52, 54 face upward, with reference to the vertical axis 28, and outward, with reference to the transverse axis 34. In operation, seeds received in the inlet 46 travel along the seed passageway 16, assisted by gravity, and emerge from the outlet 44. Alternatingly, seeds will be diverted to opposite sides of the paired row furrow opener 10 by the first and second seed deflecting surfaces 52, 54. After being deflected off of one of the first and second seed deflecting surfaces 52, 54, the seeds will continue along a trajectory discussed in greater detail below.

The at least one soil deflecting edge 18 can be integral with the seed boot body 12. It is noted that in the drawings of the exemplary embodiment, the edge 18 and the surface 20 are defined by a soil deflecting element or insert. Inserts may be plate-like structures that are affixed to a seed boot body after the seed boot body has been formed. Inserts are desirable since they can be replaced after being worn and inhibit wear of the seed boot body. The exemplary edge 18 overlays and is parallel to an edge defined directly by the seed boot body 12; the edge defined directly by the seed boot body 12 is thus not visible but exists. Likewise, the exemplary surface 20 is parallel to and spaced from a surface 56 defined directly by the seed boot body 12. It is therefore noted that while the exemplary embodiment of the present disclosure incorporates inserts, other embodiments of the present disclosure can be practiced without inserts. Thus, the at least one soil deflecting edge can be integral with the seed boot body (fixed together) as in the exemplary embodiment or integrally-formed with respect to the seed boot body (defined by the seed boot body itself).

The at least one row soil deflecting surface 20 can extend aft from the at least one soil deflecting edge 18 along the longitudinal axis 22 and can face upward with respect to the vertical axis 28. The at least one row soil deflecting surface 20 can be sloped. The exemplary row soil deflecting surface 20 is increases in elevation, with reference to or relative to the vertical axis 28 which defines the direction of elevation, with increasing distance from the at least one soil deflecting edge 18 in the aft direction along the longitudinal axis 22.

The exemplary row soil deflecting surface 20 is sloped in multiple planes. The exemplary row soil deflecting surface 20 also increases in elevation relative to the vertical axis 28 with increasing distance from one of the right side 36 and the left side 38 in a direction toward the other of the right side 36 and the left side 38 along the transverse axis 34. In other words, the row soil deflecting surface 20 also increases in elevation relative to the vertical axis 28 with increasing distance from one of the right side 36 and the left side 38 in a direction toward the first plane along the transverse axis 34.

The at least one exemplary soil deflecting edge 18 includes a first soil deflecting edge 58 and a second soil deflecting edge 60. The exemplary first soil deflecting edge 58 extends substantially horizontally between a first end 62 and a second end 64. The exemplary first end 62 is closer to the first plane than the second end 64. The second end 64 is aft of the first end 62 along the longitudinal axis 22.

The exemplary at least one soil deflecting edge 18 further comprises first and second soil deflecting edges 18, 118 integral with the seed boot body 12 and disposed on opposite sides of the first plane. The edges 18, 118 respectively include edges 58, 158 that are substantially horizontal relative to the vertical axis 28, as shown in the Figures. Each of the deflecting edges 58, 158 extends between respective first ends 62, 162 and respective second ends 64, 164. The respective first ends 62, 162 are positioned closer to the first plane than the respective second ends 64, 164. The respective first ends 62, 162 are forward of the respective second ends 64, 164 along the longitudinal axis.

The exemplary second soil deflecting edge 60 is transverse to the first soil deflecting edge 58 and extends substantially vertically between a first end 66 and a second end 68. The exemplary first end 66 of the second soil deflecting edge 60 is closer to the first soil deflecting edge 58 than the second end 68 of the second soil deflecting edge 60. The exemplary second end 68 of the second soil deflecting edge 60 is elevated relative to the first end 66 of the second soil deflecting edge 60 along the vertical axis 28.

The exemplary paired row furrow opener 10 also includes a drill point 70 defining a drill edge 72 and engaged with the seed boot body 12. The exemplary drill point 70 and the exemplary seed boot body 12 are releasably engaged with one another so that the drill point 70 can be replaced when worn. The drill point 70 forms a trench for receiving fertilizer from the fertilizer passageway 14. The exemplary drill edge 72 is positioned lower than the at least one soil deflecting edge 18 along the vertical axis 28 and forward of the at least one soil deflecting edge 18 along the longitudinal axis 22. The exemplary drill point 70 also includes at least one soil deflecting edge 76. The soil deflecting edge 76 flares in the direction away from the first plane to substantially merge with the forward-most end 62 of the first soil deflecting edge 58.

The exemplary drill point 70 defines a maximum width along the transverse axis 34. This width is referenced at 74. The at least one soil deflecting edge 18 includes the first and second soil deflecting edges 58, 60 mirrored with respect to one another on opposite sides of the first plane. The exemplary maximum width 74 is less than or equal to a size of a gap between forward-most ends 62, 66 of the first and second soil deflecting edges 58, 60. The exemplary maximum width 74 along the transverse axis 34 is less than two and three-quarters inches. The exemplary maximum width 74 along the transverse axis 34 is approximately two and one-quarter inches. However, it is noted that the maximum width can vary depending on the application and the particular implement. Existing furrow openers are three inches wide. The exemplary embodiment thus allows the trench to be formed without inhibiting the retention of relatively undisturbed soil in which the rows will be formed. Existing furrow openers disrupt the entire width of the paired rows with a drill point and then use soil deflecting surfaces to remediate the disruption by either forming a mini-trench for receiving seeds (such as done in U.S. Pat. No. 6,332,412) or by urging soil back into the trench and attempting to plane (or flatten) the disrupted soil (WO2013/177662). The present disclosure rejects both of these approaches.

The effect of the edge 18, the edge 58, and/or the edges 58, 60 on the soil to make a row as the paired row furrow opener 10 moves through the soil is the scraping of a layer of soil of some depth away from the earth and the deflecting of the layer upward and away from first plane, away from the trench formed by the drill point 70. The paired row furrow opener 10 of claim 1 wherein the seed body is further defined as only including soil deflecting surface 20s oriented away from the first plane.

Figure 2:
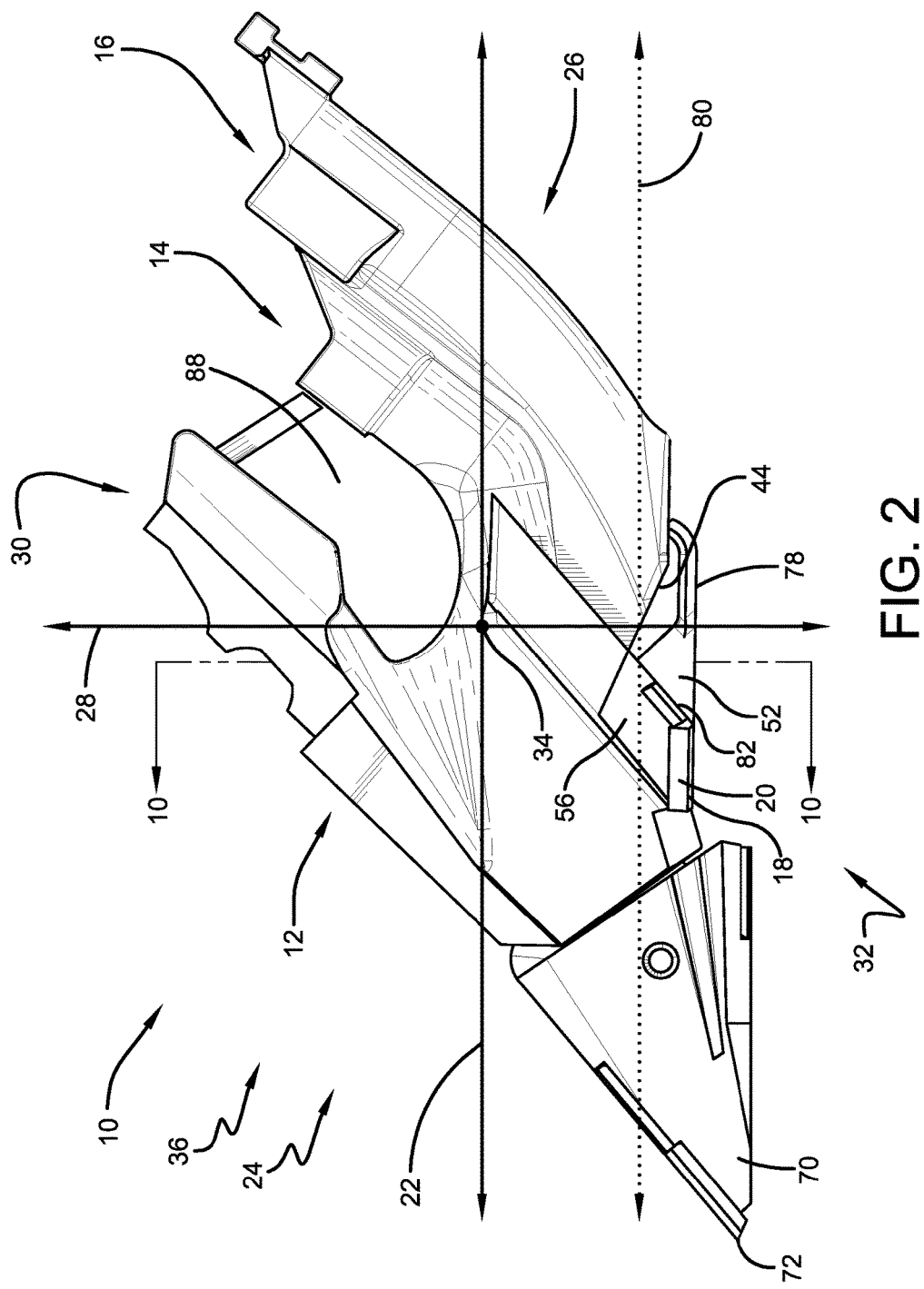
FIG. 2 is a right-side view of the paired row furrow opener shown in FIG. 1.
Figure 3:
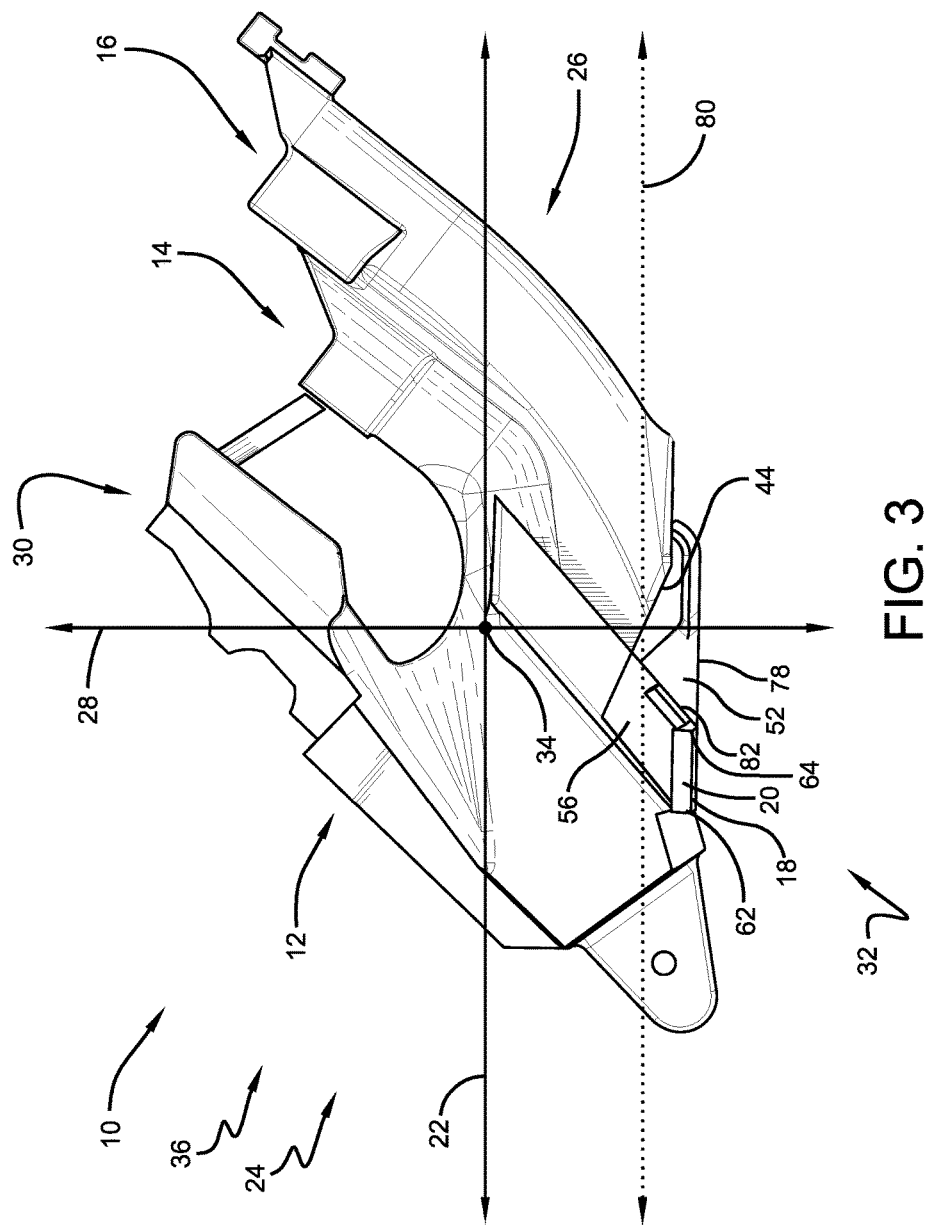
FIG. 3 is a right-side view of the paired row furrow opener shown in FIGS. 1 and 2, but without a drill point.
Figure 7A:
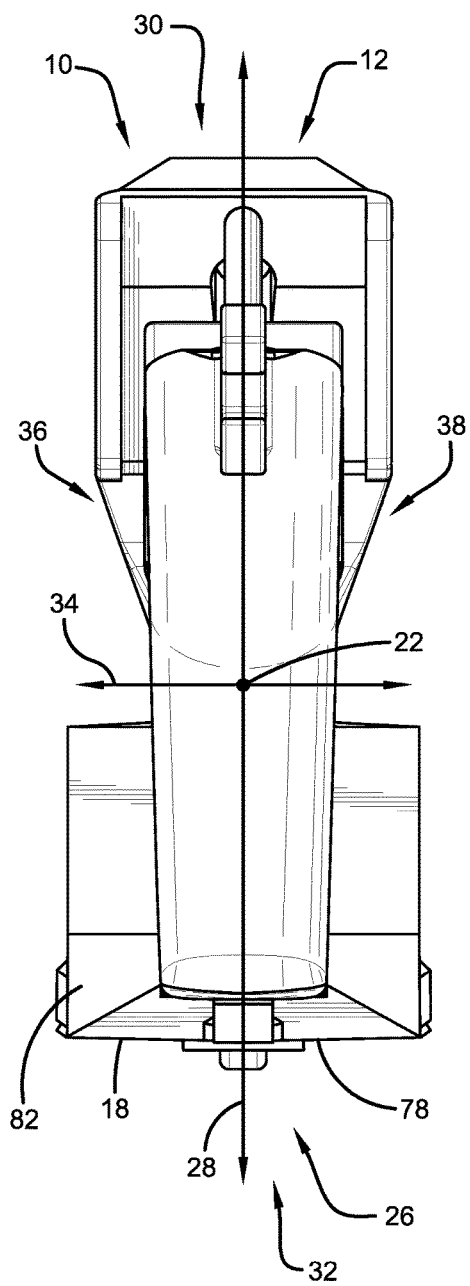
FIG. 7A is a rear view of the paired row furrow opener shown in FIG. 3.
Figure 7B:
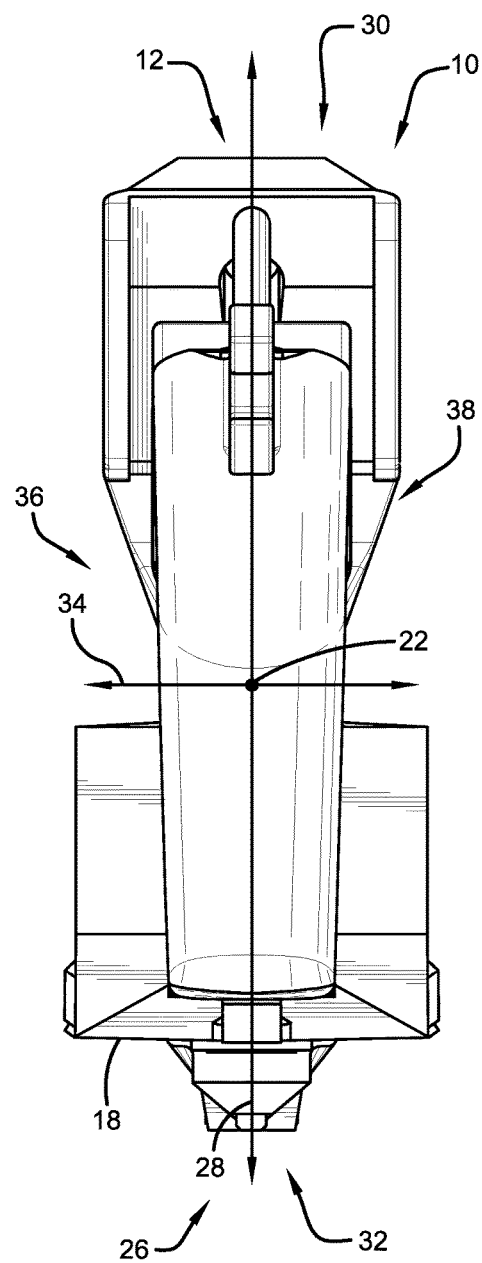
FIG. 7B is a rear view of the paired row furrow opener shown in FIG. 2.

The paired row furrow opener 10 can also include a planing surface 78 that extends aft from the at least one soil deflecting edge 18 along the longitudinal axis 22 and faces downward with respect to the vertical axis 28. The exemplary planing surface 78 is the bottom-most surface of the seed boot body 12 aft of the soil deflecting edges 58, 158 along the longitudinal axis 22 is at substantially the same height along the vertical axis 28 as the first and second soil deflecting edges 58, 158. This is shown best in FIGS. 2 and 3. The exemplary planing surface 78 is flat. The exemplary planing surface 78 is the lowermost surface of the seed boot body 12 that is aft of the at least one soil deflecting edge 18 along the longitudinal axis 22. The effect of the planing surface 78 is to form two flat surfaces of exposed soil on opposite sides of the trench. The seed deflecting surface 52 and the planing surface 78 are adjacent to one another on opposite sides of a shared edge 79.

A dashed line is referenced at 80 in the drawings. The line 80 generally represents the location of the surface of the soil adjacent to the paired row furrow opener 10 and provides a reference to the depth of the various structures during typical operation. The drill edge 72 is typically two and one-quarter inches below the surface 80. The edge 18 is typically one inch below the surface 80. The surface 80 is referred to as the cutting plane 112 in WO2013/177662.

As set forth above, the exemplary seed boot body 12 includes first and second seed deflecting surfaces 52, 54. These surfaces proximate to the outlet 14 will be designated as primary seed deflecting surfaces for purposes of description and distinction and not to imply these surfaces are more important. The paired row furrow opener 10 also includes at least one secondary seed deflecting surface. An exemplary secondary seed deflecting surface is referenced at 82. The exemplary secondary seed deflecting surface 82 is spaced from the seed deflecting surface 52 and sloped. The secondary seed deflecting surface 82 and the seed deflecting surface 52 intersect along a shared edge 81. The shared edges 79, 81 intersect one another. The exemplary secondary seed deflecting surface 82 decreases in elevation relative to the vertical axis 28 with increasing distance from the seed deflecting surface 52 in the forward direction along the longitudinal axis 22. The exemplary primary and secondary seed deflecting surfaces 52, 82 are distinct from one another, positioned proximate to the outlet 44 of the seed passageway 16, and spaced from one another. The seed deflecting surface 52 is upwardly-facing and the seed deflecting surface 82 is planar and rearwardly-facing. The exemplary secondary seed deflecting surface 82 is also downwardly facing.

Figure 9:
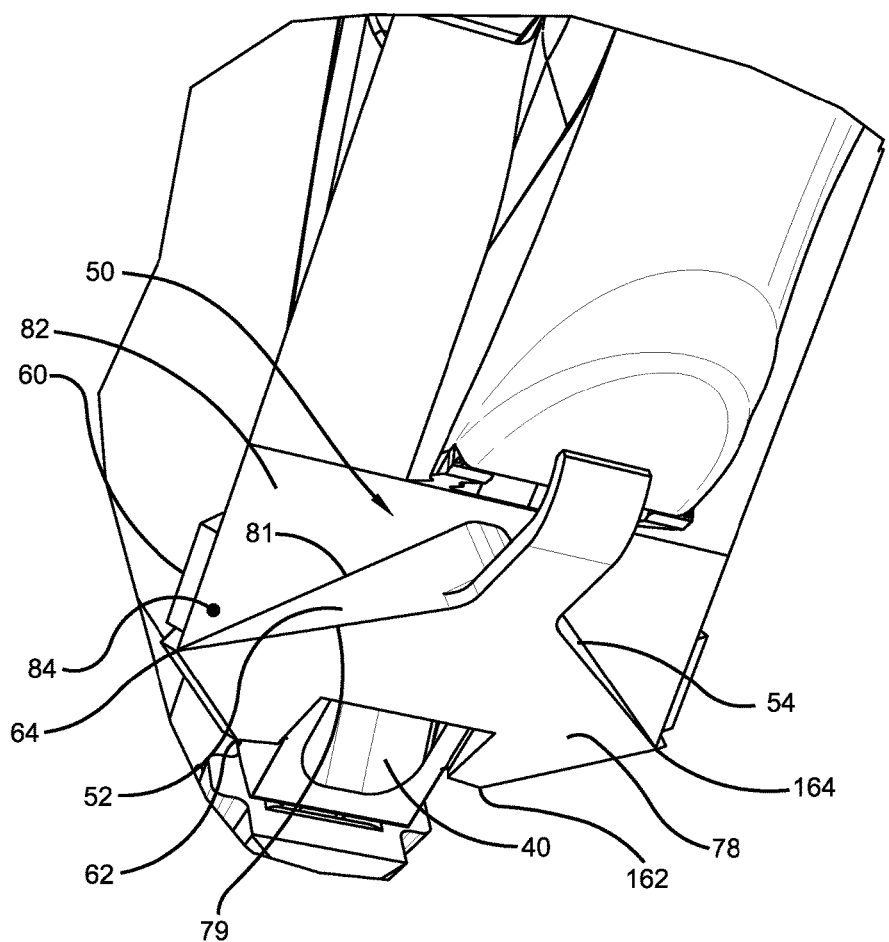
FIG. 9 is a partial perspective and magnified view of a portion of the paired row furrow opener shown in FIG. 2, the perspective taken generally from the bottom side looking up and generally from the right side looking left and generally from the rear side looking forward.

As set forth above, in operation, seeds received in the inlet 46 travel along the seed passageway 16, assisted by gravity, and emerge from the outlet 44. Alternatingly, seeds will be diverted to opposite sides of the paired row furrow opener 10 by the first and second seed deflecting surfaces 52, 54. After being deflected off of the seed deflecting surface 52, a seed will be directed away from the first plane. The momentum of the seed will also tend to cause the seed to move toward the seed deflecting surface 82 after being deflected off of the seed deflecting surface 52. After being deflected off of the seed deflecting surface 52, a seed may continue along a trajectory and collide with the secondary seed deflecting surface 82. Alternatively, after being deflected off of the seed deflecting surface 52, a seed may continue along a trajectory toward the secondary seed deflecting surface 82 but not reach the seed deflecting surface 82. It has been observed that the seed will generally collide with the seed deflecting surface 82 at a position referenced at 84 in FIGS. 9 and 10. It is noted that if a collision occurs, the seed deflecting surface 82 and seed will be moving in the same direction (forward), with the seed moving faster. If the seed collides with the seed deflecting surface 82, the seed can then deflect off of the secondary seed deflecting surface 82. The trajectory of the seed after deflecting off of the seed deflecting surface 82 will then be partially downward and partially away from the first plane. The seed will then collide with a side wall surface formed in the soil by the edge 60 and/or a flat upwardly-facing surface formed in the soil by the planing surface 78. Both of the surfaces formed in the soil will likely be non-compacted since the edges 18 and 60 are scraping, therefore any remaining momentum the seed possess will likely be absorbed and further movement of the seed inhibited. Thus, the locating of the seed away from the trench is accomplished.

Various embodiments of the present disclosure can be interconnected to a variety of different cultivators. The exemplary paired row furrow opener 10 can include a shoe portion 86 that can receive a shank extending from a cultivator. The exemplary paired row furrow opener 10 can receive a shank in the form of a c-shank, but other embodiments of the present disclosure can be interconnected to shanks having a different configuration than a c-shank. The exemplary shoe portion 86 can include an aperture 88 operable to receive a c-shank and tongue 90 with apertures 92, 94. Fasteners such as bolts can pass through the apertures 92, 94 and also pass through the apertures in the c-shank to releasably interconnect the c-shank and the exemplary paired row furrow opener 10. Embodiments of the present disclosure can be utilized on cultivators manufactured by various manufactures, including but not limited to Morris Industries™, Seed Hawk™ and Seed Master™.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A paired row furrow opener comprising:
   a seed boot body extending along a longitudinal axis between a forward end and a rearward end aft of said forward end along said longitudinal axis and also extending along a vertical axis between a bottom side and a top side elevated from said bottom side along said vertical axis and also extending along a transverse axis between a right side and a left side spaced from one another along said transverse axis, wherein said longitudinal axis is perpendicular to said vertical axis and to said transverse axis and said vertical axis and said transverse axis are perpendicular to one another and wherein said longitudinal axis and said vertical axis intersect and are coplanar in first plane centered with respect to said seed boot body;
   a fertilizer passageway extending through said seed boot body between an outlet and an inlet elevated from said outlet along said vertical axis;
   a seed passageway extending through said seed boot body between an outlet and an inlet elevated from said outlet of said seed passageway along said vertical axis;
   at least one soil deflecting edge integral with said seed boot body, said at least one soil deflecting edge substantially horizontal relative to said vertical axis and extending between a first end and a second end, said first end positioned closer to said first plane than said second end, said first end forward of said second end along said longitudinal axis;
   at least one row soil deflecting surface extending aft from said at least one soil deflecting edge along said longitudinal axis and facing upward with respect to said vertical axis; and
   wherein a bottom-most surface of said seed boot body aft of said at least one soil deflecting edge along said longitudinal axis is at substantially the same height along said vertical axis as said at least one soil deflecting edge.

2. The paired row furrow opener of claim 1 wherein said bottom-most surface is further defined as:
   a planing surface that extends aft from said at least one soil deflecting edge along said longitudinal axis, wherein said outlet of said fertilizer passageway is at least partially forward of said planing surface along said longitudinal axis.

3. The paired row furrow opener of claim 2 wherein said planing surface is further defined as extending aft from at least part of an edge of said outlet of said fertilizer passageway along said longitudinal axis.

4. The paired row furrow opener of claim 1 wherein:
   said at least one soil deflecting edge further comprises first and second soil deflecting edges on opposite sides of said first plane, both substantially horizontal relative to said vertical axis, each of said first and second soil deflecting edges extending between respective first ends and respective second ends, said respective first ends positioned closer to said first plane than said respective second ends, said respective first ends forward of said respective second ends along said longitudinal axis; and
   said bottom-most surface is further defined as a planing surface that extends aft from said first and second soil deflecting edges along said longitudinal axis and is substantially flat laterally along said transverse axis between said respective second ends.

5. The paired row furrow opener of claim 1 further comprising:
   at least one primary seed deflecting surface positioned at said outlet of said seed passageway and sloped, increasing in elevation relative to said vertical axis with increasing distance from one of said right side and said left side in a direction toward said first plane along said transverse axis, wherein said at least one primary seed deflecting surface and said bottom-most surface are adjacent to one another on opposite sides of a first shared edge.

6. The paired row furrow opener of claim 5 wherein both of said bottom-most surface and said at least one primary seed deflecting surface are flat.

7. The paired row furrow opener of claim 5 wherein neither of said bottom-most surface and said at least one primary seed deflecting surface define a portion of said seed passageway.

8. The paired row furrow opener of claim 5 further comprising:
   at least one secondary seed deflecting surface spaced from said at least one primary seed deflecting surface and sloped, decreasing in elevation relative to said vertical axis with increasing distance from said outlet of said seed passageway in a forward direction along said longitudinal axis, wherein said at least one secondary seed deflecting surface and said at least one primary seed deflecting surface intersect along a second shared edge.

9. The paired row furrow opener of claim 8 wherein said first shared edge and second shared edge intersect one another.

10. A paired row furrow opener comprising:
    a seed boot body extending along a longitudinal axis between a forward end and a rearward end aft of said forward end along said longitudinal axis and also extending along a vertical axis between a bottom side and a top side elevated from said bottom side along said vertical axis and also extending along a transverse axis between a right side and a left side spaced from one another along said transverse axis, wherein said longitudinal axis is perpendicular to said vertical axis and to said transverse axis and said vertical axis and said transverse axis are perpendicular to one another and wherein said longitudinal axis and said vertical axis intersect and are coplanar in first plane centered with respect to said seed boot body;
a fertilizer passageway extending through said seed boot body between an outlet and an inlet elevated from said outlet along said vertical axis;
a seed passageway extending through said seed boot body between an outlet and an inlet elevated from said outlet of said seed passageway along said vertical axis;
at least one soil deflecting edge integral with said seed boot body;
at least one row soil deflecting surface extending aft from said at least one soil deflecting edge along said longitudinal axis and facing upward with respect to said vertical axis; and
at least one primary seed deflecting surface positioned at said outlet of said seed passageway and sloped, increasing in elevation relative to said vertical axis with increasing distance from one of said right side and said left side in a direction toward said first plane along said transverse axis, and is upwardly-facing.

11. The paired row furrow opener of claim 10 further comprising:
at least one secondary seed deflecting surface spaced from said at least one first seed deflecting surface and sloped, decreasing in elevation relative to said vertical axis with increasing distance from said outlet of said seed passageway in a forward direction along said longitudinal axis.

12. The paired row furrow opener of claim 11 wherein said at least one primary deflecting surface is upwardly-facing and said at least one second deflecting surface is downwardly facing.

13. The paired row furrow opener of claim 11 wherein said at least one secondary seed deflecting surface is rearwardly-facing.

14. The paired row furrow opener of claim 11 wherein said seed passageway, said at least one primary deflecting surface, and said at least one secondary deflecting surface are arranged relative to one another such that, after passing through and out of said seed passageway, a seed is deflected off of said at least one primary seed deflecting surface, deflected off of said at least one secondary seed deflecting surface, and moves primarily laterally relative to said seed boot body.

15. The paired row furrow opener of claim 11 wherein:
said at least one soil deflecting edge is further defined as substantially horizontal relative to said vertical axis and extends between a first end and a second end, said first end positioned closer to said first plane than said second end, said first end forward of said second end along said longitudinal axis; and
said at least one primary deflecting surface and said at least one secondary deflecting surface are aft of said second end along said longitudinal axis.

16. The paired row furrow opener of claim 10 wherein said at least one primary deflecting surface is further defined as facing away from said first plane.

17. The paired row furrow opener of claim 10 wherein said at least one primary deflecting surface is further defined as exposed and unblocked by any other portion of said seed boot body in a direction along said transverse axis away from said first plane.

18. The paired row furrow opener of claim 10 wherein said seed passageway is enclosed between said inlet of said seed passageway and said outlet of seed passageway and wherein said at least one primary deflecting surface is spaced from said outlet of seed passageway and outside of said seed passageway.

19. The paired row furrow opener of claim 10 wherein said seed passageway and said at least one primary deflecting surface are arranged relative to one another such that, after being deflected off of said at least one primary seed deflecting surface, a seed moves forward of said outlet of said seed passageway along said longitudinal axis.

* * * * *